United States Patent [19]

Fukuta et al.

[11] Patent Number: 4,576,692
[45] Date of Patent: Mar. 18, 1986

[54] METHOD FOR CONTROLLING THE OPERATION OF A MICROWAVE-EXCITED OXYGEN PLASMA SURFACE TREATMENT APPARATUS

[75] Inventors: Kenji Fukuta; Takaoki Kaneko; Yoshinobu Takahashi, all of Toyota, Japan

[73] Assignees: Toyota Jidosha Kabushiki Kaisha; Kabushiki Kaisha Toshiba, both of Japan

[21] Appl. No.: 619,174

[22] Filed: Jun. 11, 1984

[30] Foreign Application Priority Data

Jun. 14, 1983 [JP] Japan .................................. 58-104906
Jun. 14, 1983 [JP] Japan .................................. 58-104904
Jun. 14, 1983 [JP] Japan .................................. 58-104905

[51] Int. Cl.⁴ .......................... C07C 3/24; C07C 13/00
[52] U.S. Cl. ................................ 204/165; 204/168; 422/186; 422/186.04; 427/40; 156/643
[58] Field of Search .................... 204/164, 165, 168; 422/186, 186.04; 219/121 P, 121 PU, 121 PT; 427/38, 39, 40, 45.1; 156/643

[56] References Cited

U.S. PATENT DOCUMENTS 4,065,369 12/1977 Ogawa et al. .................... 204/164

OTHER PUBLICATIONS

Mantell et al., "Activation of Plastic Surfaces in a Plasmajet", I&EC Product Research and Development, vol. 3, No. 4, Dec., 1964, pp. 300-303.

Hall et al., "Activated Gas Plasma Surface Treatment of Polymers for Adhesive Bonding", Journal of Applied Polymer Science, vol. 13, (1969), pp. 2085-2096.

Primary Examiner—John F. Niebling
Attorney, Agent, or Firm—Finnegan, Henderson, Farabow, Garrett & Dunner

[57] ABSTRACT

A method for sequentially controlling the operation of a microwave-excited oxygen plasma surface treatment apparatus in order to improve and control the quality of surface treatment. The pressure within a reactor (10) is continuously monitored and measured and a first pressure signal is issued when the pressure is reduced to a predetermined first level, whereupon flow control valves (52, 54) are opened to allow oxygen gas to flow through microwave discharge tubes (34) into the reactor (10). A second pressure signal is issued when the pressure increases to a second pressure range and microwave power generators (20, 22) are energized to excite the oxygen flowing therethrough. The plasma density is continuously monitored and measured, preferably in terms of the luminous intensity of the plasma, the amount of reflected microwave power, or a combination thereof. The plasma surface treatment is terminated after a timed duration.

14 Claims, 12 Drawing Figures

METHOD FOR CONTROLLING THE OPERATION OF A MICROWAVE-EXCITED OXYGEN PLASMA SURFACE TREATMENT APPARATUS

BACKGROUND OF THE INVENTION (1.) Field of the Invention

The present invention relates to a method for sequential control of the operation of an apparatus for modifying the surface of polymer products with microwave-excited oxygen plasma.

(2.) Description of the Prior Art

As is well known, a recent trend in the automotive industry has been to make automobile parts from plastic materials. Plastic materials offer reduced bulk density and their moldability affords wider designing flexibility.

The relatively inexpensive and readily available polyolefins such as polypropylene and polyethylene, however, are difficult to paint. Further, coatings on the surfaces of polyolefin products tend to peel easily.

To improve the paintability, wettability, and bondability of polyolefins, methods are known in the art for modifying the surface of polyolefins. In such methods, the polyolefin surface is subjected to oxygen plasma or activated oxygen gas species generated by glow discharge, corona discharge, radio frequency discharge, or microwave discharge, for the dual purposes of plasma oxidizing the surface to introduce polar radicals therein and of etching the surface to increase mechanical anchoring. For example, R. M. Mantell et al. have reported that low temperature oxygen plasma improves the surface-bonding characteristics and wettability of polyolefins (Ind. Eng. Chem. Prod. Rev., Vol. 3, No. 4, December 1964, pp. 300–303). Also, J. R. Hall et al. have reported that the bondability of polypropylene and polyethylene is increased by oxygen plasma surface treatment (J. Appl. Polym. Sci., Vol. 13, 1969, pp. 2085–2096).

The results of these experiments triggered the development of plasma treatment apparatuses capable of modifying polymer surfaces on a commercial and industrial scale. For example, Japanese Unexamined Patent Publication (Kokai) No. 53-85782 (1978) discloses an apparatus for modifying a polymer surface with microwave-excited oxygen plasma which comprises a microwave power generator connected by a waveguide with a microwave discharge tube to which a stream of oxygen gas is supplied from a gas source. The oxygen gas in the discharge tube is excited by microwave discharge into oxygen plasma which is introduced into a reactor to contact and surface modify the polymer articles received therein. The reactor is a sealed enclosure defining a reaction chamber and has a movable door to permit access to the reaction chamber. The reactor is connected to a vacuum pump and is held on a substantially vacuum condition during plasma treatment. In operation, the access door is opened and a desired number of polymer articles to be surface treated are placed in the reactor. Following closure of the door, the vacuum pump is operated to evacuate the reaction chamber, and the oxygen gas, together with other reaction gases as required, is allowed to flow through the microwave discharge tube into the reactor. As the pressure within the reactor decreases down to a required level, i.e., as the reaction chamber is subjected to a vacuum of a certain level, the microwave power generator is energized to generate oxygen plasma. After treatment, the access door is opened and the treated articles are taken out. Thus, the plasma processings according to this apparatus are performed on "batch" cycles.

The result or degree of plasma surface treatment and, hence, the surface quality of the treated articles, depends on processing factors such as the pressure within the reactor, the flow rate of oxygen gas, and the input power of microwave discharge. Conventional methods of testing and analyzing the results of plasma surface treatment include X-ray electron spectroscopy for chemical analysis (ESCA) and Fourier transform infrared spectroscopy (FF-IR). The simplest method may include the measurement of the contact angle, whereby the wettability of treated surface is quantitatively measured. All of these testing methods are based on the measurement of the quantity of hydrophilic radicals such as —OH, >C=O, and —NHC=O formed in the outermost layer of the treated articles through a thickness of from 10 to about 500 angstroms. Although these methods are effective for testing and analysis of the results of plasma treatment, they nevertheless are not applicable to commercial plasma treatment apparatuses for controlling the surface quality of articles under processing because the treatment is conducted in batch cycles, as mentioned above, and since the testing and measurement can be conducted only after completion of plasma processing.

SUMMARY OF THE INVENTION

The object of the present invention is to provide a method for sequential control of the operation of an apparatus for modifying the surface of polymer articles with microwave-excited oxygen plasma, which method is capable of controlling the degree of surface modification for each cycle of plasma treatment to minimize fluctuation in surface quality of treated articles.

The microwave-excited oxygen plasma treatment apparatus, which is controlled by the method according to the invention, comprises a microwave power generator operatively connected by a waveguide with a microwave discharge tube so as to excite a stream of oxygen gas supplied from a source of oxygen gas to flow through the discharge tube into a reactor which is connected to a vacuum pump to continuously maintain the pressure at substantial vacuum conditions throughout the period of operation of the apparatus. A flow control valve is provided between the source of oxygen gas and the discharge tube to control the flow of oxygen gas.

According to the invention, the method of controlling the microwave-excited oxygen plasma treatment apparatus comprises the steps of: (a) after commencement of evacuation of the reactor, continuously monitoring and measuring the pressure in the reactor and generating a first pressure signal when the pressure decreases to a predetermined pressure level and a second pressure signal when the pressure thereafter increases to fall within a predetermined pressure range which is higher than the first-mentioned predetermined pressure level; (b) opening the flow control valve in response to the first pressure signal to allow a stream of oxygen gas to flow at a controlled flow rate into the discharge tube and thence into the reactor; (c) turning on the microwave power generator in response to the second pressure signal thereby exciting the stream of oxygen gas in the discharge tube to generate oxygen plasma; (d) continuously monitoring and measuring the density of oxygen plasma thus generated and generating a density signal when the measured plasma density is within a predetermined density range; and (e) closing the flow control valve and turning off the microwave power generator in response to the density signal and after a lapse of predetermined time period from the generation of the density signal.

The first pressure signal in step (a) above is indicative of the condition that the vacuum pump has evacuated the reactor to a sufficient degree required to start oxygen supply. The second pressure signal in the same step (a) indicates that the pressure in the reactor has increased to some extent due to the oxygen gas flowing therein, but that the pressure is still in a permissible range required for plasma generation as a result of the flow rate of oxygen gas being in equilibrium with the rate of evacuation by the vacuum pump. In this manner, one of the parameters of plasma treatment, i.e., the pressure in the reactor, is controlled. The density signal issued in step (d) is indicative of a condition that the level of excitation of gas species is in a range required for resulting proper degree of plasma oxidation. Therefore, by properly selecting the duration of treatment in step (e) it is possible to control the degree of surface treatmeht and, hence, the quality of the treated surface.

In an embodiment of the invention, the monitoring and measurement of plasma density is achieved in terms of the amount of light emission from the oxygen plasma. Alternatively, the monitoring and measurement may be performed in terms of absorption spectrum of oxygen plasma.

In a preferred embodiment of the invention, a small amount of nitrogen gas is admixed at a predetermined flow rate to the stream of oxygen gas and is subjected to microwave discharge in the discharge tube together with the oxygen gas. The activated nitrogen atoms react with oxygen atoms to form nitrogen monoxide, which is excited to issue a light of the visible band. Thus, the plasma density may be monitored and measured in terms of the luminous intensity of the excited nitrogen monoxide in combination with oxygen plasma.

The monitoring and measurement of plasma density may be conducted at or in the vicinity of the discharge tube, within the end of the waveguide located adjacent the discharge tube, within the reactor, or at or in the vicinity of a distribution tube provided between the discharge tube and the reactor to distribute the oxygen plasma over the length of the reactor.

In the microwave-excited plasma treatment apparatus, the microwave produced by the microwave power generator is directed through the waveguide to the discharge tube in which a part of the microwave energy is consumed to generate plasma. The remainder of the microwave is reflected by the grounded back wall of the waveguide in the reverse direction and is taken out from the waveguide by means of an isolator. The incident microwave power which is input from the microwave power generator into the waveguide is constant, while the reflected microwave power is complementary to the energy absorbed by the gas to generate the plasma. Therefore, the reflected microwave power will reflect the presence of plasma as well as the degree of activation.

Thus, in another preferred embodiment of the invention, the plasma density may be monitored and measured in terms of the reflected microwave power which is reflected by the back wall of the waveguide and propagating therethrough in the reverse direction. The measurement of the reflected microwave power may be carried out at a distance of less than 10 m, preferably 5 m, from the discharge tube.

The monitoring and measurement of the pressure in the reactor may be achieved by using a vacuum meter and the processing time may be measured by a timer.

DESCRIPTION OF THE PREFERRED EMBODIMENTS

Figure 1:
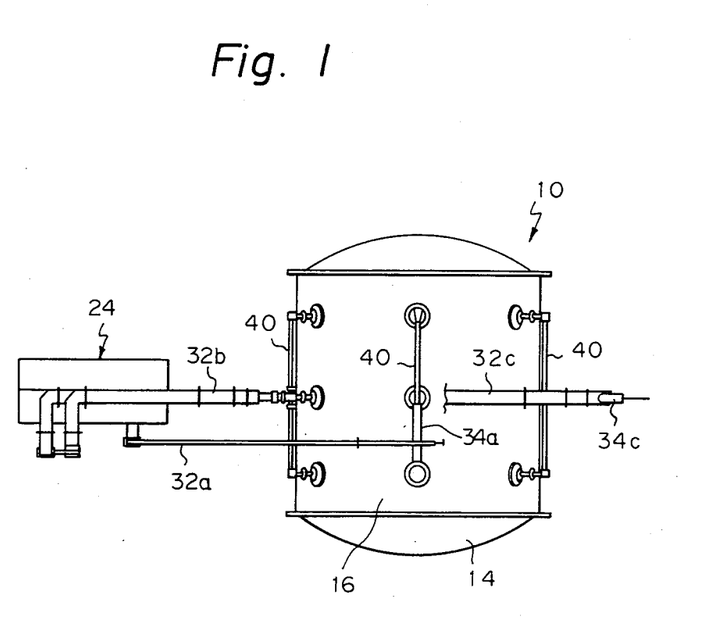
FIG. 1 is a schematic top plan view of a part of the microwave-excited oxygen plasma surface modifying apparatus which is controlled by the method according to the invention.
Figure 2:
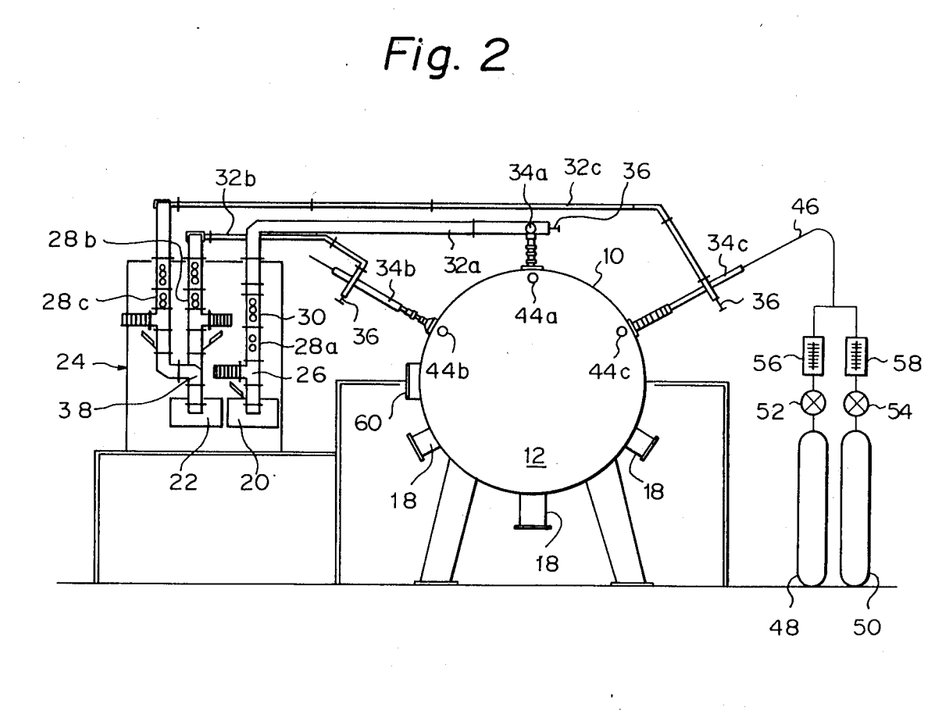
FIG. 2 is a schematic front elevational view of the apparatus illustrating the overall arrangement of the components.

Referring to FIGS. 1 and 2, the apparatus for modifying the surface of polymers with microwave-excited oxygen plasma includes a substantially cylindrical reactor 10 defining a reaction chamber 12 having a size of, for example, 2 m in length and 2 m in diameter. The reactor 10 includes in the usual manner a manually operable access door 14 hinged to the cylindrical body 16 to permit placement and removal of a plurality of molded or shaped polymer articles, such as automobile parts, in and out of the reaction chamber 12. The reactor is provided with a plurality of exhaust ports 18 connected to a vacuum pump (not shown), which may be manually controlled.

As best shown in FIG. 2, the apparatus comprises main and auxiliary microwave power generators 20 and 22 (manufactured and marketed by Kabushiki Kaisha Toshiba Toshiba Corporation; to be referred to hereinafter as Toshiba), Japan, Model TMG-132F, 1.5 kW (max.) each, ISM 2,450 MHz) which are mounted at the back of a controller 24. The main microwave power generator 20 rated, for example, at 500 W is connected through an isolator 26 (manufactured and marketed by Toshiba, Model TMU-279), a power monitor 28a (Toshiba, Model TMU-613A), and a three-stab tuner 30 (Toshiba, Model TMU-298) to a waveguide 32a, which is in turn associated in the conventional intersecting manner with a quartz discharge tube 34a. As usual, the waveguide 32a is provided at its end with a movable plunger 36 for adjusting the grounded back wall (not shown) of the waveguide 32 in such a position that the intensity of electric field of microwave discharge becomes maximum at the region of the discharge tube 34a. The isolator 26 serves to take out and absorb the microwave reflected by the waveguide back wall to protect the microwave power generator 20. The Model TMU- 613A power monitor 28a is modified as described later with reference to FIG. 4.

The auxiliary microwave power generator 22 rated, for example, at 1 kW is connected to a distributor 38 which distributes the microwave power from the generator 22 to two waveguides 32b and 32c, which are connected in a microwave transmitting relationship with lateral discharge tubes 34b and 34c, respectively. Each of the waveguides 32b, 32c is connected, respectively, to the auxiliary microwave power generator 22 through a corresponding isolator, power monitor 28b or 28c, and three-stab turner, as in the case of the main microwave power generator 20.

Microwave discharge tubes 34a through 34c are connected, respectively, to plasma distribution tubes 40a through 40c made from Pyrex (trademark) glass and each having a series of branches 42 extending in an air-tight fashion through apertures in the reactor body 16 into the reaction chamber 12 wherein each series of branches 42 are connected, respectively, to Pyrex glass shower tubes 44a through 44c designed to distribute the plasma over the articles to be treated.

The inlet end of respective microwave discharge tubes 34a through 34c is connected by suitable flexible tubings (only one of which is shown at 46 in FIG. 2, the other tubings being omitted for simplicity of the drawing) to an oxygen gas cylinder 48 and a nitrogen gas cylinder 50. The flow of gases from respective cylinders 48 and 50 are controlled ON/OFF by solenoid valves 52 and 54 operated by the controller 24. The flow rate of gases is measured by flow meters 56 and 58.

A conventional vacuum gauge, such as a Pirani gauge 60, is mounted to the reactor 10 and is adapted to monitor and measure the pressure in the reactor 10. The Pirani gauge 60 is provided with a built-in meter relay circuit having a pair of contacts which are closed when the measured pressure becomes less than a first predetermined level and another pair of contacts which are closed when the pressure then increases and reaches a second predetermined level higher than the first predetermined level. The meter relay circuit is connected to the controller 24 to supply pressure signals thereto.

Although not pertaining to the scope of the present invention, it is preferable to provide a Tesla coil for each of microwave discharge tubes 34a through 34c at the region of their inlet end or any other suitable position, so that the oxygen gas is pre-excited by the high tension discharge of the Tesla coil prior to microwave discharge.

Figure 3:
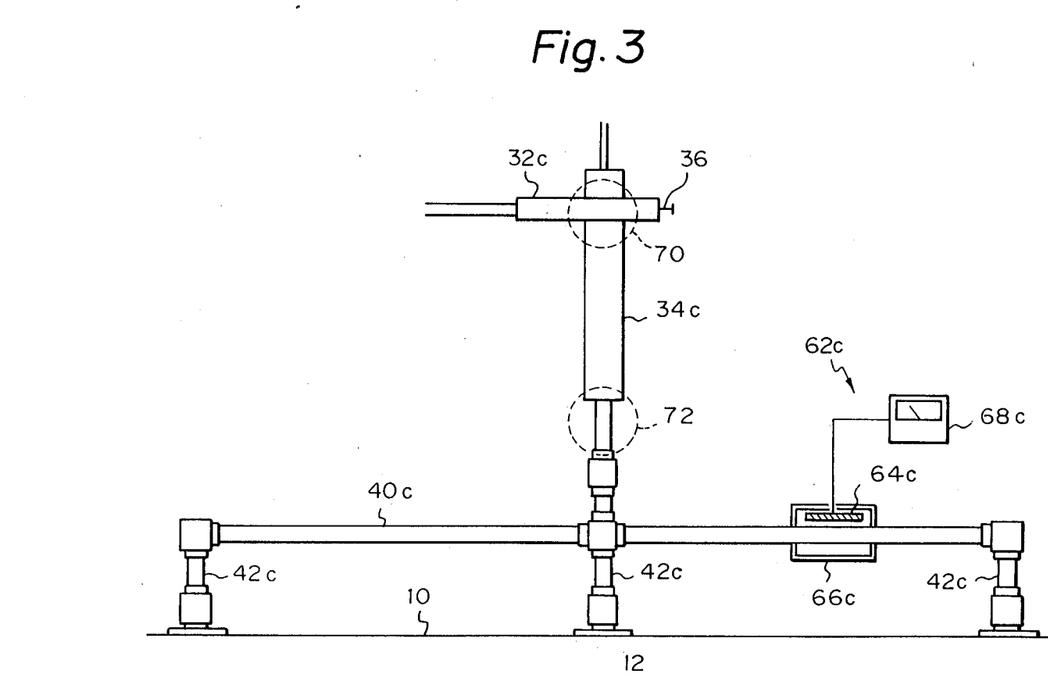
FIG. 3 is an elevational view of the layout of an illuminometer for monitoring and measuring the luminous intensity of excited gases.

For each of the plasma distribution tubes associated with the microwave discharge tubes 34a through 34c, a conventional illuminometer is provided to monitor and measure the intensity of emission from both reactive oxygen plasma and activated nitrogen monoxide gas. FIG. 3 shows the arrangement of such an illuminometer with respect to one of the plasma distribution tubes, say, tube 40c associated with the lateral microwave discharge tube 34c. The illuminometer 62c (manufactured and marketed by Yokokawa Denki, Japan, Model LX-3) comprises a photosensor 64c mounted within a light impermeable enclosure 66c secured to the Pyrex plasma distribution tube 40c. The illuminometer 62c includes a metering box 68c having a built-in meter relay provided with a pair of contacts which are closed when the measured luminous intensity becomes less than a predetermined level. The photosensor 64c may be positioned at any other suitable locations, such as at the end of the waveguide 32c as indicated by the dotted circle 70, around the microwave discharge tube 34c, at the end of the discharge tube 34c as indicated by the dotted circle 72, or within the reactor 10.

Figure 4:
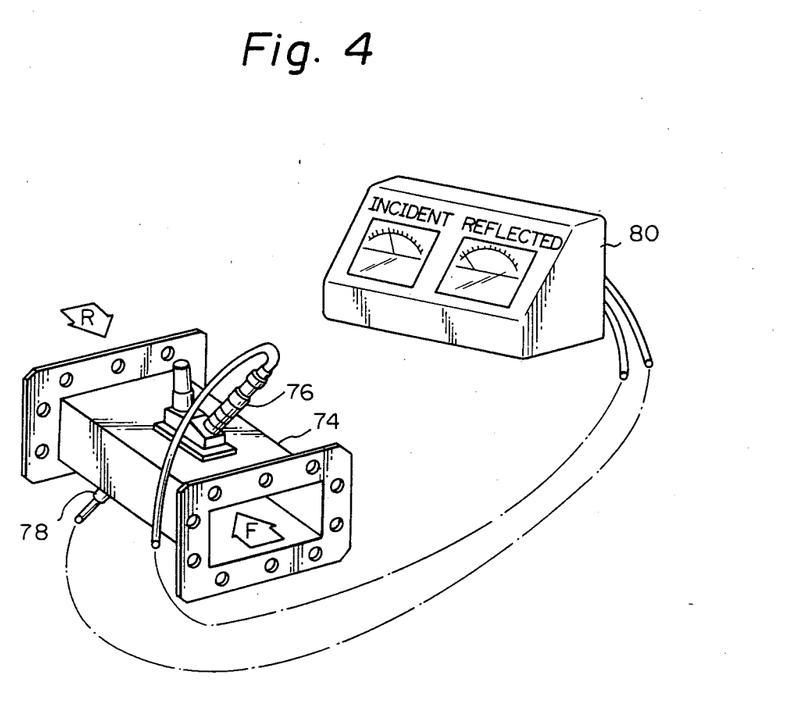
FIG. 4 is a perspective view of a power meter.

The power monitors 28a through 28c associated with waveguides 32a through 32c have a common structure as shown in FIG. 4. Each power monitor 28 comprises a sensing portion 74 provided with an incident power sensor 76 and a reflected power sensor 78 electrically connected with a metering box 80 and is adapted to monitor and measure both the incident microwave power passing through the sensing portion 74 in the direction of the arrow F and the reflected microwave power propagating in the reverse direction shown by the arrow R. The Model TMU-613A power monitor 28 is modified to the extent that the metering box 80 is provided with a meter relay having a pair of contacts which are closed when the reflected microwave power exceeds a preset level. The meter relays of respective power monitors 28a through 28c are connected to the controller 24.

Figure 5:
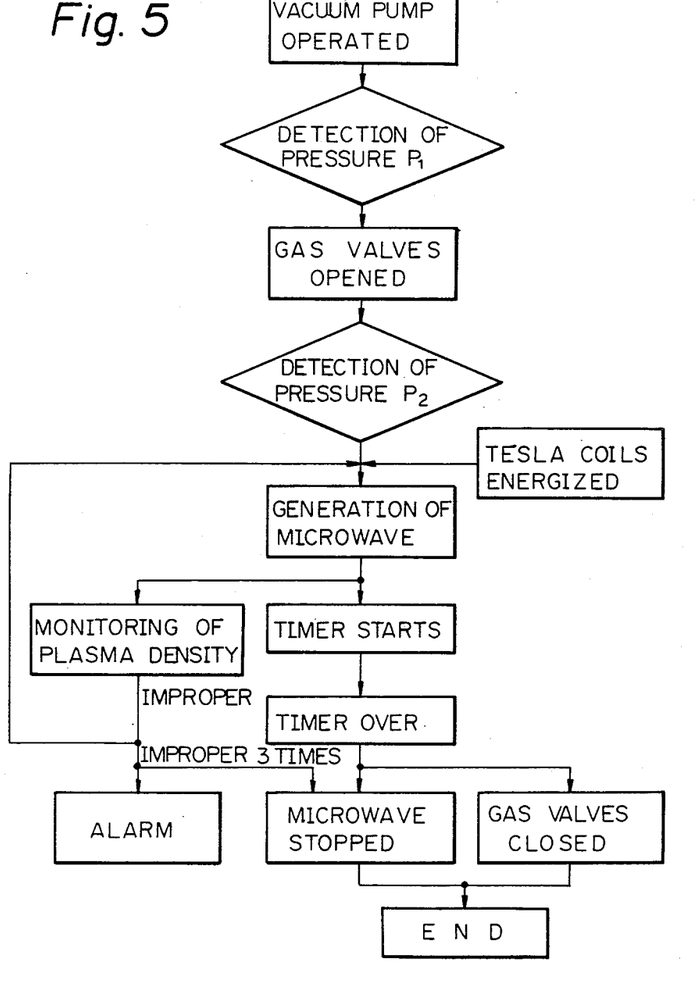
FIG. 5 is a flow chart showing the sequence of operation control of the apparatus according to the method of the invention.

The method of the invention for controlling the plasma treatment apparatus will now be described with reference to the flow chart shown in FIG. 5. The polymer products or articles are placed within the reaction chamber 12 and the vacuum pump turned on manually to evacuate the reaction chamber. As the vacuum pump operates, the pressure within the reaction chamber 12 becomes less than a first pressure level $P_1$ (for example 0.3 Torr) which is detected by the vacuum meter 60, whereupon the flow control valves 52 and 54 are opened to permit the oxygen and nitrogen gas to flow into the reactor 10. The flow rate of those gases is controlled by the flow meters 56 and 58 so that the total flow rate becomes, for example, 5 l/m and the ratio of the oxygen with respect to nitrogen is, for example, 10:1. The gases with the thus controlled flow rates are fed through gas tubings 46 into respective microwave discharge tubes 34a through 34c and then therefrom into the reactor 10.

The feed of oxygen and nitrogen gases results in the increase of the pressure in the reaction chamber 12. As the pressure increases to reach a second pressure level $P_2$ (for example, 0.5 Torr) which is higher than the pressure $P_1$ but still within a range of substantial vacuum condition required for plasma treatment, the pressure $P_2$ is detected by the vacuum meter 60. Thereafter, the microwave power generators 20 and 22 are turned on to generate microwaves which are transferred through isolators 26, power monitors 28, three-stab tuners 30, and waveguides 32 into respective discharge tubes 34a through 34c. Prior to or simultaneously with the microwave generation, the Tesla coils associated with the discharge tubes are energized for about one to three seconds, timed by a timer, thereby producing a high tension discharge of 400 to 500 kV across the microwave discharge tubes. This discharge by Tesla coils causes dissociation of the oxygen gas flowing through the microwave discharge tubes to ionize the gas and produce electrons to a considerable degree, though not so perfect as by the microwave discharge. The dissociated oxygen gas is transferred to the discharge tube located in the region of the maximum electric field produced by microwave discharge, without undergoing substantial loss in the activated ionized condition due to the fact that the distance of transfer is limited. The electrons thus produced trigger the instantaneous formation of the high energy oxygen plasma when the microwave discharge occurs. In other words, the preionized oxygen gas is subjected to microwave discharge so that the reflected microwave power becomes minimum. The oxygen gas in the form of a plasma is then transferred through distribution tubes 40 into the reaction chamber 12 and distributed through shower tubes 44 over the polymer products to be treated.

In the illustrated embodiment, the duration of plasma treatment is timed by a timer which controls the microwave power generators 20 and 22.

Figure 6:
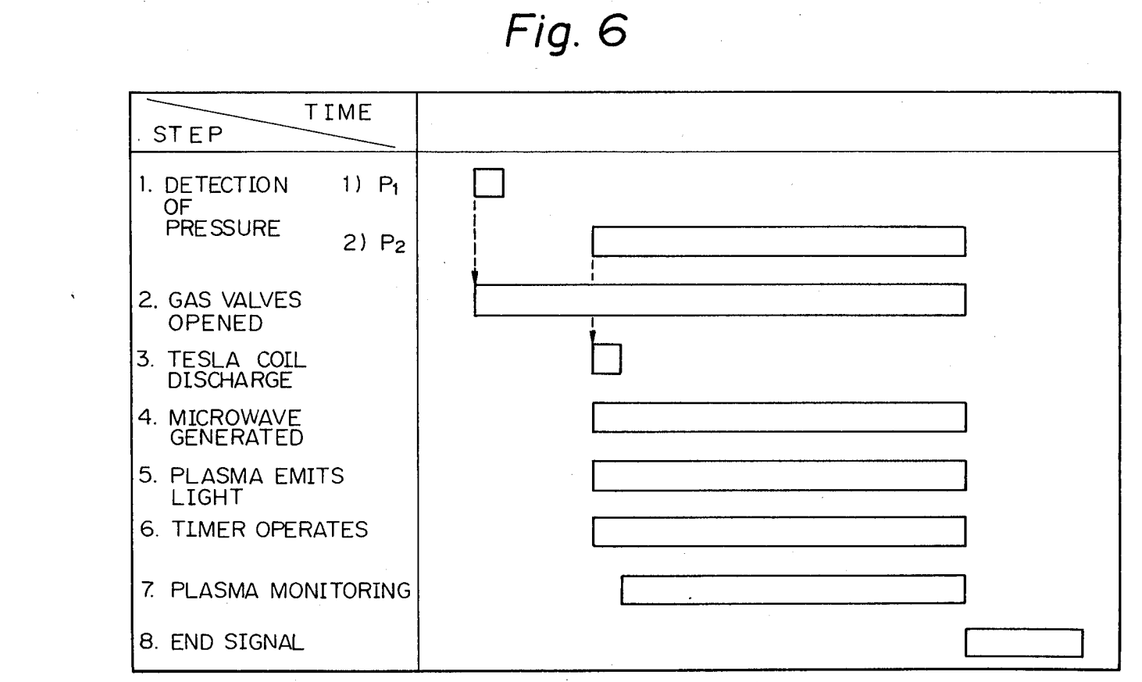
FIG. 6 is a time chart showing the timing of operation of various components of the apparatus.

Futher, the density of plasma representing the condition of plasma formation is monitored and measured continuously, by means of the illuminometers 62a through 62c and power monitors 28a through 28c. If the density of plasma is not adequate, that is, the plasma condition is improper, for any reasons, the energization of the Tesla coils and microwave power generators are repeated, for example, three times. If the plasma condition is still improper after three repetitions of energization, an alarm circuit is operated and the operation of the plasma treatment apparatus is withheld. To the contrary, when the formation of oxygen plasma occurs in a proper condition, the microwave power generators are continued to be operated for a predetermined time period, for example, 30 seconds depending on the desired degree of plasma treatment. Thereafter, the microwave power generators 20 and 22 are turned off and the flow control valves 52 and 54 are closed to terminate plasma treatment. The vacuum pump may then be turned off manually. FIG. 6 shows a time chart of the aforementioned steps of the method according to the invention.

Figure 7:
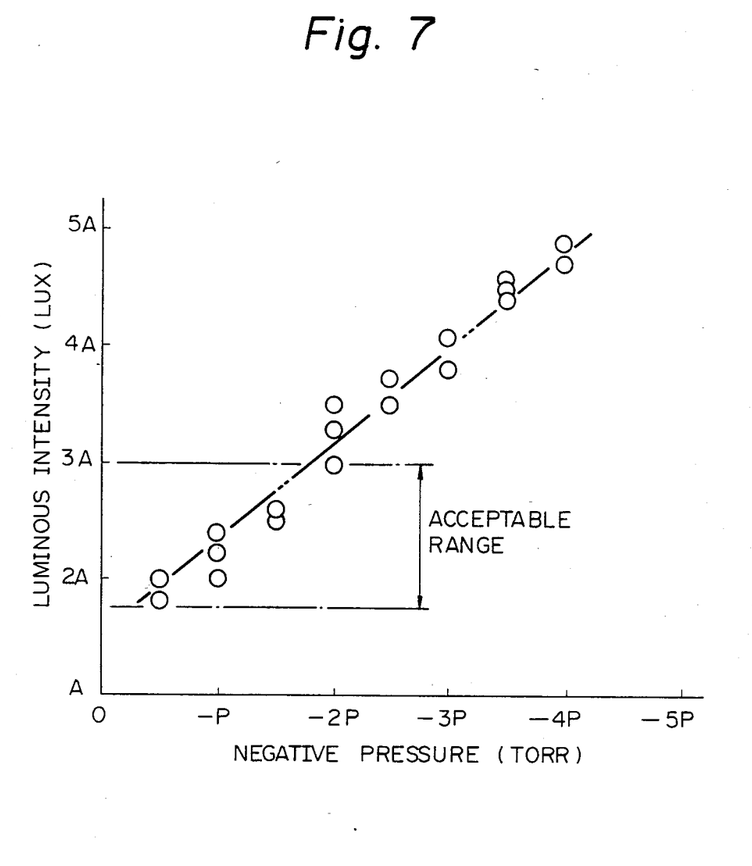
FIG. 7 is a graph showing an example of desired range of luminous intensity and reactor pressure.

FIG. 7 shows the relationship between the measured luminous intensity and the negative pressure in the reaction chamber. The experiments are conducted under varying pressure conditions and varying plasma density conditions, with the total flow rate of oxygen and nitrogen gases controlled at 5 l/m, the ratio of oxygen gas to nitrogen gas at 10:1, and a total microwave power of 800 W. As is apparent, the plasma density represented by the luminous intensity increases as the negative pressure increases (namely, the absolute pressure in the reaction chamber decreases) in order to obtain the same degree of surface modification. It will be appreciated that for a given range of pressure, the luminous intensity may be controlled within an acceptable range defined by the upper and lower limits so as to obtain a desired degree of plasma treatment.

Figure 8:
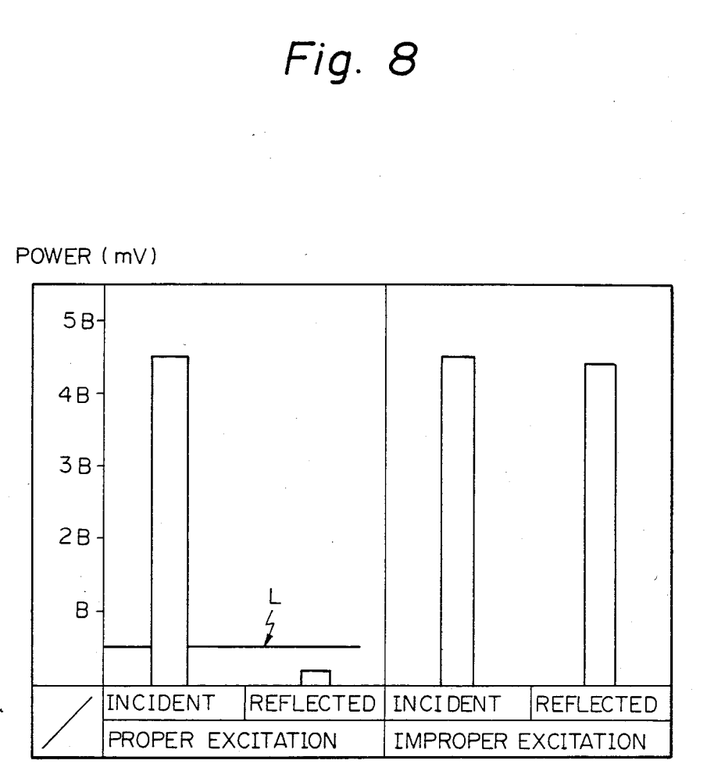
FIG. 8 is a graph showing the level of reflected microwave power.

As mentioned hereinbefore, the amount of microwave power reflected by the back wall of the waveguide may be used to judge whether or not the plasma is generated in a proper manner. The graph of FIG. 8 illustrates the level of reflected microwave power during proper plasma generation in comparison with that during abnormal and improper plasma generation. It will be appreciated that by observing the reflected microwave power below the upper limit L, it is possible to control the quality of surface modification.

FIGS. 9 through 12 illustrate in detail the circuitry of the controller 24 employed for performing the method according to the invention. Throughout these drawings, electric lines designated by the same reference numerals indicate identical lines.

Figure 9:
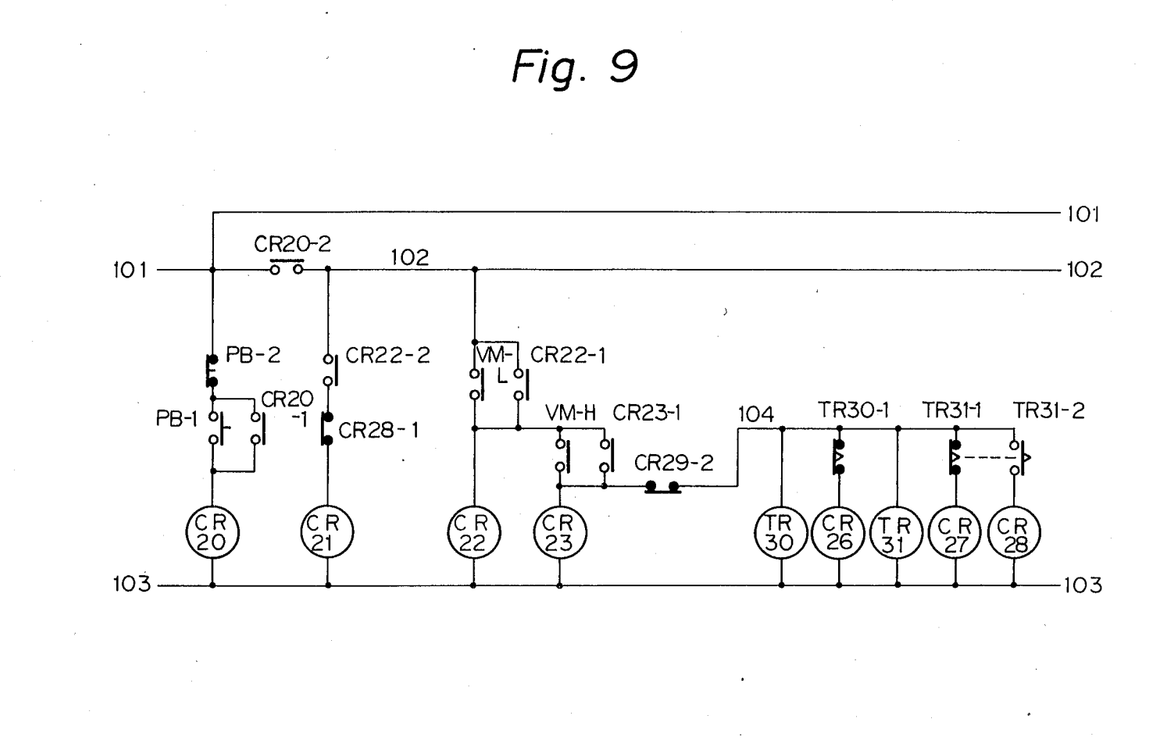
FIGS. 9 through 12 are wiring diagrams illustrating in combination the circuit structure of the controller used to perform the method according to the invention.

Referring to FIG. 9, an electric voltage is applied between the lefthand sections of the lines 101 and 103. Between these lines 101 and 103, there are connected in series a normally closed manual pushbotton switch PB-2, a normally open manual pushbotton switch PB-1, and a circuit relay CR20 which has a normally open first contact assembly CR20-1 connected in parallel to the switch PB-1 and a normally open second contact assembly CR20-2 disposed in a line 102 branched from the line 101. The relay CR20 serves as a power interrupter with its contact CR20-2 forming and breaking the line 102 in response to the positions of pushbotton switches PB-1 and PB-2.

Figure 10:
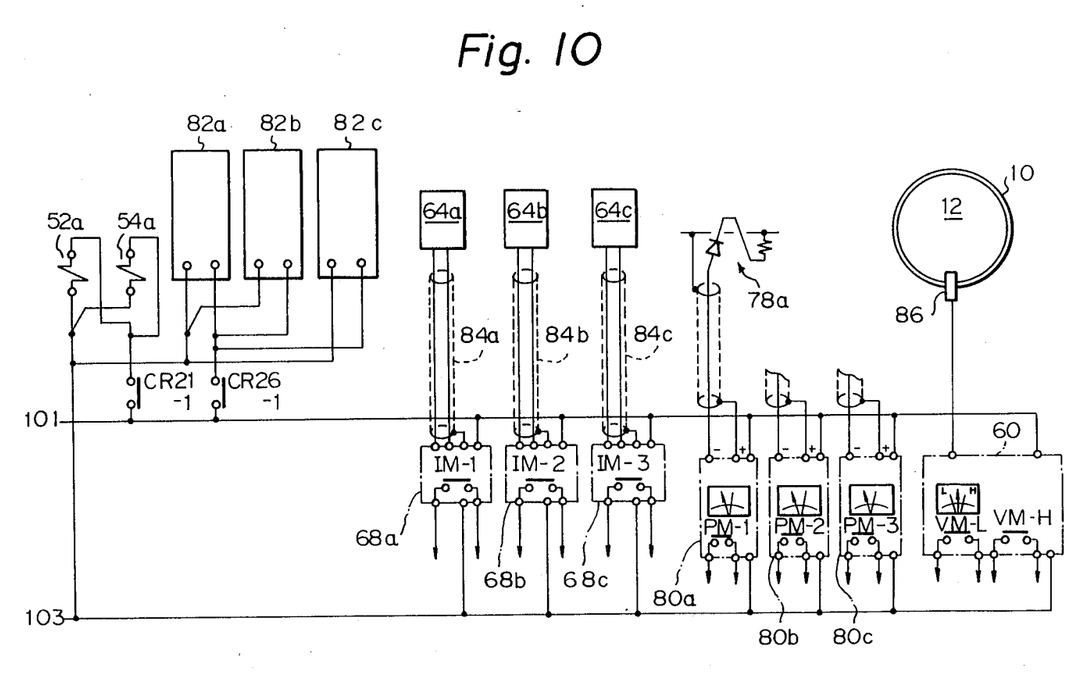

Between the lines 102 and 103, there are connected in series a normally open contact assembly CR21-2 of a relay CR21 described later, a normally closed contact assembly CR28-1 of a relay CR28 described later, and a relay CR21. The relay CR21 acts as an interrupter for energizing the solenoid valves 52 an 54 and, toward this end, has a normally open contact assembly CR21-1 connected in series with the coils of these valves (FIG. 10).

Also connected in series between the lines 102 and 103 are a normally open "LOW" contact assembly VM-L of the vacuum meter 60 (shown in FIG. 10) and a relay CR22 which has a normally open first contact assembly CR22-1 connected in parallel with the contact assembly VM-L and the aforementioned normally open second contact assembly CR22-2. As described later, the relay CR22 serves to energize the relay CR21 to open the gas valves 52 and 54 when the pressure in the reaction chamber decreases to a predetermined level to close the contact assembly VM-L of the vacuum meter 60.

A normally open "HIGH" contact assembly VM-H of the vacuum meter 60 (FIG. 10) is connected in parallel with the relay CR22 and in series with a relay CR23. The relay CR23 has a normally open single contact assembly CR23-1 connected in series in a branch line 104 and serves as an interrupter for the line 104 in response to the closing and opening of the vacuum meter "HIGH" contact assembly VM-H.

Between the lines 104 and 103, there are connected, in parallel with each other, a timer TR30, a relay CR26, a timer TR31, a relay CR27, and a relay CR28. The relay CR26 has its normally open contact assembly CR26-1 (FIG. 10) and serves for ON/OFF control of the Tesla coils (FIG. 10). The relay CR26 is in turn timed by the timer TR30, which has a normally closed contact assembly TR30-1 connected in series with the relay CR26. The relay CR27 has normally open contact assemblies CR27-1 and CR27-2 connected to the microwave power generators 20 and 22 (FIG. 12) and acts to energize and de-energize the latter. The relay CR28 has its normally closed contact assembly CR28-1 connected in series with the relay CR21 and serves to control the electric current to the relay CR21. The timer TR31 is provided with a normally closed contact assembly TR31-1 and a normally open contact assembly TR31-1 which are interconnected with each other so that one of them is closed when the other is open. These contact assemblies TR31-1 and TR31-2 are adapted to control power supply to the relays CR27 and CR28, respectively.

Referring to FIG. 10, the coils 52a and 54a of the solenoid valves 52 and 54 are connected between the lines 101 and 103 through the contact assembly CR21-1 of the relay CR21. Also, Tesla coils 82a through 82c associated with respective discharge tubes 34a through 34c are connected between the lines 101 and 103 through the contact assembly CR26-1 of the relay CR26. Similarly, the metering boxes 68a through 68c of respective illuminometers 62a through 62c associated with respective discharge tubes are connected between the power lines 101 and 103. Photosensors 64a through 64c are connected to respective metering boxes 68a through 68c. Each of the metering boxes 68 is provided with a normally open meter-relay contact assembly IM-1, IM-2, or IM-3 which is closed when the luminous intensity of the plasmas detected by the photosensors 64a through 64c becomes lower than a predetermined lower limit shown in FIG. 7. In the illustrated example, the metering boxes 68a through 68c are not provided with any meter-relay contact assembly for detecting the upper limit of the acceptable range shown in FIG. 7. This is based on the presumption that the plasma density will rarely exceed the acceptable range and that only the upper limit may be controlled for the purposes of plasma treatment. The signal lines between the photosensors 64a through 64c and the metering boxes 68a through 68c are shielded by grounded shields 84a through 84c.

The metering units 80a through 80c of the Model TMU-613A power monitors 28a through 28c are also connected between the lines 101 and 103. The power monitor are modified to the extent that they are provided with respective normally open meter-relay contact assemblies PM-1 through PM-3 which are closed as movable indicator needles thereof are brought into contact with adjustable fixed needles when the power of the reflected microwave exceeds a predetermined level L shown in FIG. 8. The reflected power sensors (only one, 78a, being shown in FIG. 10) are connected by shielded lines to respective metering units 80a through 80c.

The vacuum meter 60 comprising a conventional Pirani gauge is connected between the lines 101 and 103 and has its pressure sensor 86 mounted to the reactor 10. The vacuum meter 60 is provided with a meter relay which includes a movable indicator needle cooperating with a pair of "LOW" and "HIGH" adjustable needles operatively associated with the contact assemblies VM-L and VM-H. The "LOW" needle may be adjusted, for example, at 0.3 Torr and the "HIGH" needle, for example, at 0.5 Torr. Thus, the meter-relay contact assembly VM-L is closed when the pressure in the reactor 10 decreases to 0.3 Torr, while the contact assembly VM-H is closed when the pressure reaches 0.5 Torr. The vacuum meter 60 is not provided with meter-relay means for detecting the upper limit of the acceptable pressure range, the lower limit of which is set at 0.5 Torr. This is also due to the presumption that the pressure will substantially be in the permissible range once 0.5 Torr is detected.

Figure 11:
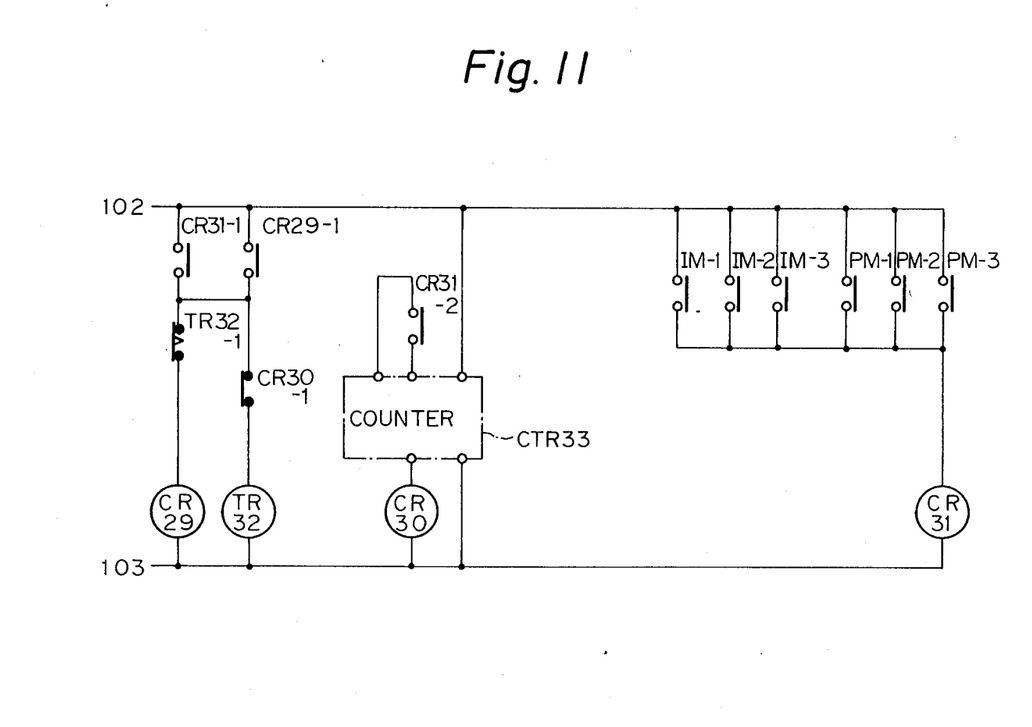

The contact assemblies 68a through 68c and PM-1 through PM-3 are connected as shown in FIG. 11.

FIG. 11 shows a circuit arrangement for repeating for predetermined times the energization of microwave power generators as well as the Tesla coils in circumstances in which one of the illuminometers 62a through 62c and power monitors 28a through 28c has detected a condition of improper plasma formation. This circuit portion comprises a relay CR29, a timer TR32, a counter CTR33, a relay CR30, and a relay CR31. The relay CR29 has a normally open self-maintaining contact assembly CR29-1 connected in parallel with a normally open contact assembly CR31-1 of the relay CR31 and also has a normally closed contact assembly CR29-2 which is placed in the line 104 as shown in FIG. 9. The timer TR32 has its normally closed contact assembly TR32-1 connected in series with the relay CR29. The relay CR30 has its normally closed contact assembly CR30-1 connected in series with the timer TR32. The counter CTR33 receives input pulses from a normally open contact assembly CR31-2 of the relay CR31 and is adapted to energize the relay 30 upon counting, for example, three pulses. The contact assemblies IM-1 through IM-3 of the illuminometers and the contact assemblies PM-1 through PM-3 of the power monitors are connected in parallel with one another and in series with the relay CR31.

Figure 12:
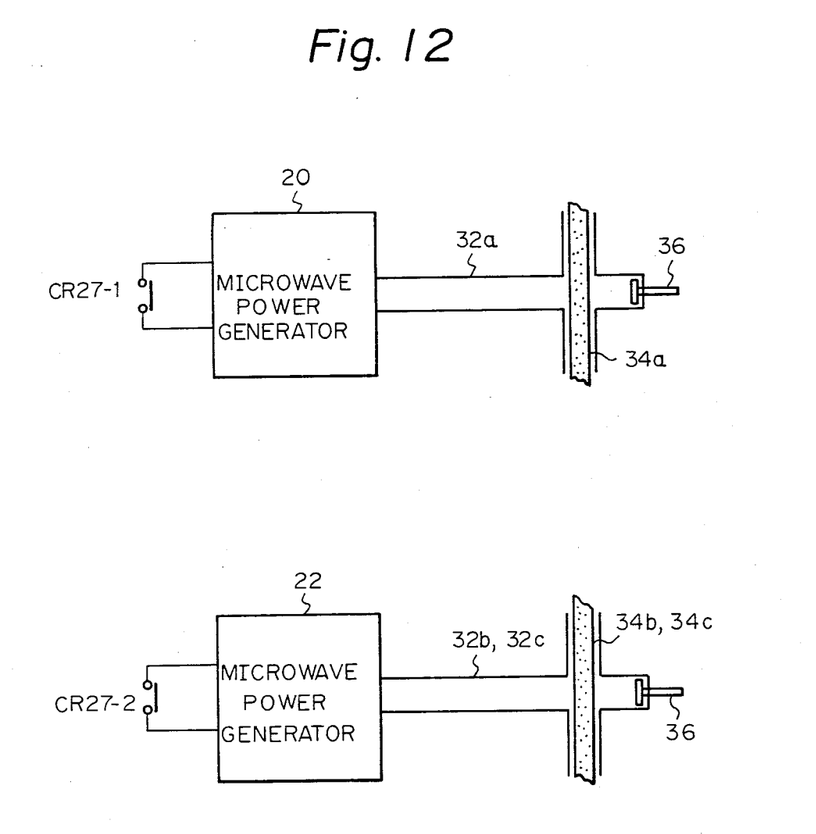

FIG. 12 illustrates the contact assemblies CR27-1 and CR27-2 connected with the microwave power generators 20 and 22.

The operation of the controller 24 is as follows.

As the operator presses the pushbotton switch PB-1 (FIG. 9), the relay CR20 is energized to close the contact assembly CR20-2 so that a voltage is applied between the lines 102 and 103. At the same time, the contact assembly CR20-1 is closed to self-maintain the relay CR20. As the vacuum pump (not shown) operates, the pressure in the reaction chamber 12 decreases to reach the lower limit, say 0.3 Torr, so that the "LOW" contact assembly VM-L (FIG. 10) of the vacuum meter 60 is closed, causing the relay CR22 to be energized to close its contact assemblies CR22-1 and CR22-2, whereby the relay CR22 is self-maintained and the relay CR21 is energized to open the solenoid valves 52 and 54, thereby permitting the oxygen and nitrogen gases to flow into the reaction chamber 12. This causes the pressure in the reaction chamber to increase so that the contact assembly VM-L is then opened. However, the relay CR22 continues to be energized as it is self-maintained with its contact CR22-1 closed. As the pressure further increases to reach the higher level, say 0.5 Torr, the "HIGH" contact assembly VM-H of the vacuum meter is closed to energized the relay CR23, whereby the contact assembly CR23-1 is closed to self-maintain the relay CR23 as well as to supply electric power through the line 104 to the timer TR30, relay CR30, timer TR31, and relays CR27 and CR28.

As a result, the relay 26 is energized to operate the Tesla coils 82a through 82c (FIG. 10) until the timer TR30 is over to open the contact assembly TR30-1 to de-energize the relay CR26 after a lapse of certain time period, say 3 seconds. Thus, the Tesla coils are energized, causing high tension discharge to occur across the microwave discharge tubes and thereby assisting the excitation of gases by microwave discharge. Simultaneously, the relay CR27 is energized, which in turn energizes the microwave power generators 20 and 22, whereby the gases flowing through the microwave discharge tubes are activated into plasma. The energization of the relay CR27 and, hence, of the microwave power generators continues until the timer TR31 is over after a lapse of a predetermined time period, for example, about 30 seconds, whereupon the timer contact assembly TR31-1 is opened to de-energize the relay CR27 while the contact assembly TR31-2 is closed to energize the relay CR28, so that the contact assembly CR28-1 is opened to de-energize the relay CR21, causing the gas valves 52 and 54 to be closed. In this manner, a cycle of plasma treatment is completed. The operator may then press the pushbutton switch PB-2 to reset the controller ciruit to the initial condition.

During the initial period of microwave discharge, it may happen that the reactant gases are not excited to a sufficient degree required for the formation of plasmas of adequate density due to any reasons. In those situations, one or more of the illuminometer contact assemblies IM-1 through IM-3 and power monitor contact assemblies PM-1 through PM-3 are closed, thereby energizing the relay CR31 (FIG. 11). This causes the contact assembly CR31-1 to move toward its closed position to energize the relay CR29, whereby the contact assembly CR29-1 is closed to self-maintain the relay CR29 and the contact assembly CR29-2 (FIG. 9) is opened so that the power supply to the Tesla coils and microwave power generators is terminated. Due to the termination of the microwave discharge, the contact assemblies IM-1 through IM-3 and PM-1 through PM-3 resume their normal open position, thereby de-energizing the relay CR31. Thus, the contact assembly CR31-2 is opened to issue a signal to the counter CTR33. Also, the de-energization of the relay CR31 causes its contact assembly CR31-1 to open but the relay CR29 continues to be energized due to the self-maintain contact CR29-1 being closed. The timer TR32 may be set to 1 to 3 seconds. When the timer TR32 is over, the timer contact assembly TR32-1 is opened to de-energize the relay CR29 so that the contact assembly CR29-2 (FIG. 9) is closed. Thus, the apparatus is now ready for repeating a further cycle of Tesla coil and microwave discharge. If plasma with sufficient density is produced in the subsequent discharge cycle the treatment is completed as described above. However, if after repetition by three discharges any of the illuminometers and power monitors detect improper plasma formation, the counter CTR33 issues a signal to energize the relay CR30, whereby the relay contact CR30-1 is opened to de-energize the timer TR32. Thus, the timer contact assembly TR32-1 remains closed so that the relay CR29 continues to be self-energized with its contact assembly CR29-1 being closed. As a result, the contact assembly CR29-2 (FIG. 9) of the relay CR29 is opened so that there occurs no futher microwave discharge. The signal from the counter CTR33 may be used to actuate an alarm system (not shown).

Although the present invention has been described herein with reference to specific embodiments thereof, it should be understood that various changes and modifications may be made therein without departing from the scope of the present invention. For example, the plasma density may be monitored and measured in terms of ionic current in the reactor.

We claim:
1. A method for sequentially controlling the operation of an apparatus for modifying the surface of polymer products with microwave-excited oxygen plasma, said apparatus including a microwave power generator operatively connected by a waveguide with a microwave discharge tube to excite a stream of oxygen gas flowing from a source of oxygen gas through said discharge tube into a reactor, said stream of oxygen gas being controlled by a flow control valve provided between said source of oxygen gas and said discharge tube, said reactor being adapted to be evacuated to continuously maintain the pressure therein at substantial vacuum conditions throughout the operational period of said apparatus, said method comprising the steps of:
after commencement of evacuation of said reactor, continuously monitoring and measuring the pressure in said reactor and generating a first pressure signal when said pressure decreases to a predetermined pressure level and a second pressure signal when said pressure thereafter increases to fall within a predetermined pressure range higher than said predetermined pressure level;
opening said flow control valve in response to said first pressure signal to allow a stream of oxygen gas to flow at a predetermined flow rate into said discharge tube and thence into said reactor;
turning on said microwave power generator in response to said second pressure signal to excite said stream of oxygen gas in said discharge tube to generate oxygen plasma which is then transferred into said reactor to react upon the polymer products received therein;
continuously monitoring and measuring the density of oxygen plasma thus generated and generating a density signal when the measured plasma density is within a predetermined density range; and
closing said flow control valve and turning off said microwave power generator in response to said density signal and after a lapse of predetermined time period from the generation of said density signal.

2. A method as defined in claim 1, wherein said monitoring and measurement of the density of oxygen plasma is performed in terms of the amount of light emission from the oxygen plasma.

3. A method as defined in claim 1, wherein said monitoring and measurement of the density of oxygen plasma is performed in terms of absorption spectrum of the oxygen plasma.

4. A method as defined in claim 1, wherein a controlled small amount of nitrogen gas is added to said stream of oxygen gas upstream of said discharge tube to permit the oxygen gas in said discharge tube to react with the nitrogen gas to form an excited gas of nitrogen monoxide issuing visible light, and wherein said monitoring and measurement of the density of oxygen plasma is performed in terms of the luminous intensity of said excited nitrogen monoxide gas and said oxygen plasma.

5. A method as defined in one of claims 1 through 4, wherein said monitoring and measurement of the density of oxygen plasma is performed at or in the vicinity of said discharge tube.

6. A method of as defined in one of claims 1 through 4, wherein said monitoring and measurement of the density of oxygen plasma is performed within the end of said waveguide located adjacent to said discharge tube.

7. A method as defined in one of claims 1 through 4, wherein said monitoring and measurement of the density of oxygen plasma is performed within said reactor.

8. A method as defined in one of claims 1 through 4, wherein said apparatus comprises a distribution tube disposed between said discharge tube and said reactor for distributing the oxygen plasma generated in said discharge tube over the length of said reactor and wherein said monitoring and measurement of the density of oxygen plasma is performed at or in the vicinity of said distribution tube.

9. A method as defined in claim 1, wherein said monitoring and measurement of the density of oxygen plasma is performed in terms of the power of microwave reflected by a back wall of said waveguide and propagating therethrough in the reverse direction.

10. A method as defined in claim 9, wherein said monitoring and measurement of the density of oxygen plasma is performed at a distance of less than 10 m from said discharge tube.

11. A method as defined in claim 1, wherein said monitoring and measurement of the pressure in the reactor is performed by means of a vacuum meter.

12. A method as defined in claim 1, wherein said predetermined time period is measured by means of a timer.

13. A method as defined in claim 1, wherein said step of turning on said microwave power generator in response to said second pressure signal is repeated if the measured density of oxygen plasma is less than said predetermined density range.

14. A method as defined in claim 13, wherein the operation of the apparatus is stopped when the measured plasma density does not reach said predetermined range after repetition for predetermined times of said step of turning on said microwave power generator.

* * * * *